United States Patent [19]

March et al.

[11] 4,403,949
[45] Sep. 13, 1983

[54] ROSIN FLUX FILTRATION SYSTEM

[75] Inventors: Edward J. March, Lower Makefield Township, Bucks County, Pa.; George M. Wenger, Franklin Township, Somerset County, N.J.

[73] Assignee: Western Electric Company, Inc., New York, N.Y.

[21] Appl. No.: 278,151

[22] Filed: Jun. 29, 1981

[51] Int. Cl.³ .......................... F24H 7/00; F27B 9/00; B01D 9/04
[52] U.S. Cl. ...................................... 432/29; 62/123; 432/147
[58] Field of Search ............. 432/29, 147; 228/180 R, 228/223; 62/123; 210/774

[56] References Cited

U.S. PATENT DOCUMENTS

| Re. 30,399 | 9/1980 | Ammann et al. | 228/180 R |
|---|---|---|---|
| 872,257 | 11/1907 | Schicht | 62/123 |
| 1,954,929 | 4/1934 | Green | 219/326 |
| 4,077,467 | 3/1978 | Spigarelli | 165/105 |
| 4,244,505 | 1/1981 | Stokes et al. | 228/223 |
| 4,348,174 | 9/1982 | Spigarelli | 432/197 |

FOREIGN PATENT DOCUMENTS 500383 1/1951 Belgium .

Primary Examiner—John J. Camby
Attorney, Agent, or Firm—D. J. Kirk

[57] ABSTRACT

A flux filtration system (10) for removing rosin flux from a heat transfer liquid (14). The flux and heat transfer liquid (14) on an article (17) that has been condensation soldered is drained into a pan (13) located within a condensation soldering facility (11). The pan (13) diverts the liquid-flux mixture from a boiling reservoir of the liquid (14) in the lower portion of the facility (11). The liquid-flux mixture drained during a plurality of batch soldering operations is accumulated in a coarse flux filter (21). Periodically the filter (21) outpulses the coarsely filtered material sequentially through a heat exchanger (23), a fine flux filter (24), a preheater (28) and is then returned to the reservoir in the facility (11). When the liquid-flux mixture is not being outpulsed from the filter (21), the liquid (14) from the reservoir flows into the heat exchanger (23) and passes through the remainder of the filtration system (10) to maintain a flow therethrough to clean the system and prevent buildup of flux within the system (10).

9 Claims, 5 Drawing Figures

ROSIN FLUX FILTRATION SYSTEM

TECHNICAL FIELD

The instant invention is related to a flux filtration system.

BACKGROUND OF THE INVENTION

In the prior art it is well known to solder, fuse or braze articles by condensing hot saturated vapor of a heat transfer liquid thereon. Typically such operations are performed in a chamber having a reservoir of the heat transfer liquid therein. Immersion heating coils in the reservoir are activated to boil the liquid while cooling coils mounted in the upper portion of the chamber are used to condense vapor from the boiling liquid. Such an arrangement forms a confined body of hot saturated vapor by substantially precluding the escape of the vapor from the chamber. The articles are then immersed in the body of vapor which condenses thereon and gives up its latent heat of vaporization thereto to heat the articles to the temperature required for soldering, brazing or fusing. Such a technique is described in U.S. Pat. No. Re. 30,399 which issued on Sept. 9, 1980 and is assigned to Western Electric Company and Bell Telephone Laboratories, Inc. and is incorporated by reference herein.

This technique has proven to be eminently successful, however, solder flux placed on the article to be soldered is washed therefrom by the liquid condensate and falls into the reservoir of the boiling heat transfer liquid. The flux and other contaminants coming in contact with the immersion heaters can cause "hot spots" on the heaters which can lead to thermal degradation of the heat transfer fluid. Also, the presence of large quantities of flux in the heat transfer fluid accelerates the formation of acid within the vapor environment which leaves undesirable ionic contamination on processed parts and shortens the useful life of the chamber.

U.S. Pat. No. 4,077,467 describes a system for removing the flux from the heat transfer liquid. The mixture of the high temperature (e.g., 419° F.) liquid with the flux suspended therein is drained from a reservoir into a cooling chamber, the flux thereby becoming solidified in suspension. The suspended, solidified flux is then filtered out by a mechanical filter at the output line of the cooling chamber. The heat transfer liquid passing through the filter is then pumped back into the reservoir.

A further addition that has been used with such a filtering arrangement is a pan located within the body of vapor located between the heat transfer liquid and the position of the article as it is being soldered. The flux and the heat transfer liquid drain by gravity from the article into the pan which has a conduit that directs the liquid into the cooling chamber, through the filters and back into the reservoir.

Such techniques result in a periodic passing of the flux contaminated heat transfer liquid through the system. That is, the condensing liquid and flux will drain from the soldered article, during the solder reflow cycle, and pass into the filtration system as the average temperature of the article approaches the vapor temperature of the heat transfer fluid. The flow of condensate through the filtration system is rapid at the beginning of each solder reflow cycle when the temperature difference between process part and vapor is maximum. As the article temperature approaches the temperature of the vapor, the condensate flow to the filtration system is reduced. Ultimately, the article reaches thermal equilibrium with the vapor and the condensate flow subsides entirely, the soldered article is then removed from the facility and the cycle repeated. Accordingly, the flux contaminated heat transfer liquid pulses through the filtration system periodically.

The pulsed flow of flux contaminated liquid through the system has been found to clog conduits, valves, pumps and heat exchangers in existing filtration systems. Apparently the clogging is due to flux adhering to the relatively cooler surfaces throughout the filtration system prior to removal of the contaminants by mechanical filter cartridges. Such clogging results in an inefficient system wherein liquid flow therethrough becomes restricted and necessitates increased maintenance and cleaning of both the filters and condensation facility.

Accordingly, there exists a need for an efficient flux filtration system that requires minimal maintenance and cleaning.

SUMMARY OF THE INVENTION

The foregoing problems have been overcome by the instant method of removing flux from a liquid-flux mixture draining from an article subjected to condensing, hot, saturated vapor from a boiling reservoir of the liquid in a condensation heating facility. The method comprises the steps of: diverting the draining mixture, from the boiling liquid reservoir to a first flux filter; accumulating the mixture in the first flux filter to remove a portion of the flux therefrom; alternately discharging the filtered mixture from the first flux filter and the liquid from the reservoir to provide a continuous flow into a heat exchanger to lower the temperature thereof to precipitate out flux residue therein; and passing the liquid with the precipitate therein, through a second flux filter resulting in a substantially flux free heat transfer liquid.

DETAILED DESCRIPTION

The instant solder flux filtration system is described in association with its use with a condensation soldering facility. However, such description is for purposes of exposition and not for limitation for the instant system may be used to filter flux or flux-like materials from a liquid in other systems such as vapor degreasers or the like.

The term flux or solder flux as used herein refers to that material applied to an article to be soldered to reduce the surface tension of the molten solder and remove oxides from the articles in order for the solder to flow and form a strong bond. In a particular embodiment a rosin flux, Alpha 100, manufactured by Alpha Metals Co., was used but the instant invention is not limited to filtering a specific flux. Any flux having materials therein which will adhere to a cool surface can be effectively filtered using the instant techniques.

In prior art flux filtration systems associated with condensation soldering facilities, it is known to divert primary heat transfer liquid condensate and rosin flux which drips from the articles during the soldering process from a boiling reservoir of the liquid within the facility. The condensate liquid-flux mixture flows through one or more mechanical filters to remove the flux and the filtered condensate is fed back to the reservoir of the condensation soldering facility. The mechanical filters may be one of many well known filters comprising a container with a replaceable fiberglass or cotton mesh filter cartridge. Although such a system can work effectively, it necessitates the changing of the mechanical filter elements on at least a daily basis which is time consuming and expensive. Additionally, the hot heat transfer liquid-flux mixture is cooled continuously as it passes through the filtration system prior to entry into the mechanical filter cartridge housing resulting in deposition of the flux on the inside surface of the system components resulting in blockage of the lines, valves, pumps and heat exchangers.

FLUX FILTRATION SYSTEM

Figure 1:
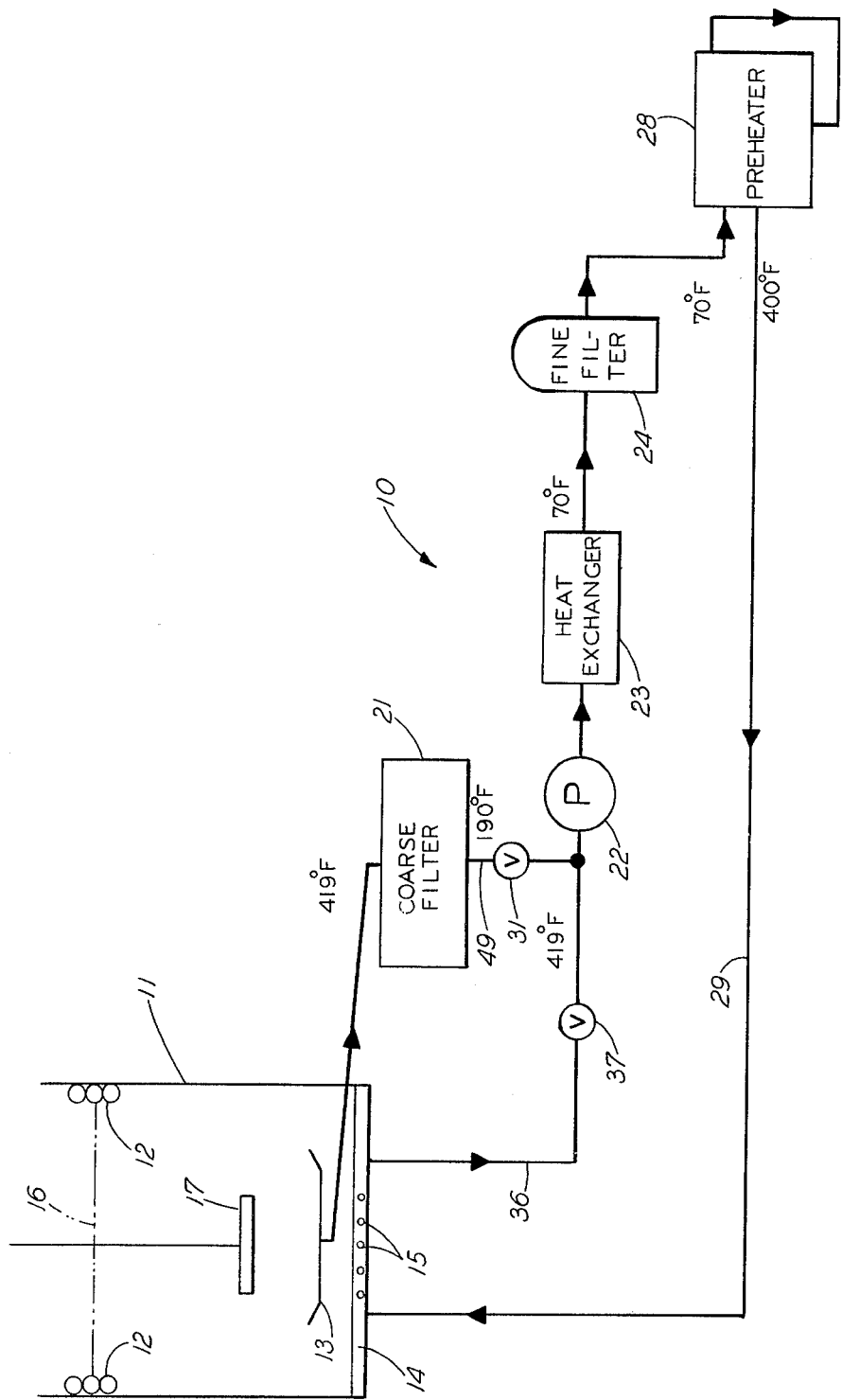
FIG. 1 depicts a flux filtration system which incorporates the instant inventive concepts.

The instant continuous rosin flux filtration system, generally designated by the numeral 10 in FIG. 1, substantially overcomes the foregoing problems. A condensation soldering facility 11, shown schematically, is described in detail in U.S. Pat. No. Re. 30,399 which is incorporated herein by reference. The facility 11 has a cooling coil 12 mounted therein, a condensate drain pan 13 and a reservoir of primary heat transfer liquid 14 in the lower portion thereof with immersion heaters 15—15 therein.

In operation, the heaters 15—15 are activated to boil the heat transfer liquid 14 (e.g., Fluorinert FC-70) and form a body of hot (e.g., 419° F.) saturated vapor between a level indicated by a phantom line 16 through the cooling coil 12 and the surface of the heat transfer liquid. An article 17 having solder preforms, solder paste or electroplated solder and rosin flux thereon is immersed in the body of vapor which condenses on the solder and the article causing the solder to reflow. The article 17 is then removed from the facility 11 and the solder solidifies to bond or fuse portions of the article together. During the solder reflow process, condensed vapor (i.e., heat transfer liquid) as well as rosin flux will drip from the article and fall into the drain pan 13. As hereinbefore indicated, rosin flux has been found to be deleterious to the condensation soldering process. Thus, it is most desirable to filter out the flux from the primary heat transfer liquid 14.

The liquid-flux mixture falling from the article 17 passes through the tandem combination of a coarse filter 21, a pump 22, a water cooled heat exchanger 23, a mechanical filter 24, and a preheater 28 having an output 29 that discharges filtered heat transfer liquid 14 back into the reservoir of the facility 11.

The coarse filter 21 removes substantial portions of the rosin flux in the hot liquid-flux mixture. The filter 21 has sufficient volume to accommodate approximately 4 to 6 sequential batch condensation soldering operations depending on the product being processed. Thus, 4 to 6 pulses of the liquid-flux mixture are required to fill up the coarse filter 21 which takes about 4.5 minutes. During this time an output valve 31 is closed. After the filter 21 is filled to a predetermined level, the valve 31 is opened and the liquid free of visible rosin flux is forwarded to the heat exchanger 23 by the pump 22 where the liquid is cooled to approximately 70° F. to precipitate out any flux that remains in solution with warm heat transfer liquid. The liquid with the flux precipitate entrained therein is then discharged into the fine mechanical filter 24 which will remove substantially all of the remaining particulate flux residue and dirt in the liquid.

The filtered heat transfer liquid 14 leaving the fine mechanical filter 24 is at a temperature of about 70° F. The liquid 14 cannot be directly fed back into the facility 11 for the mixing with the liquid 14 therein, at approximately 419° F., would result in turbulence and lowering of the temperature of the mixture. Such turbulence and lowering of the temperature can alter the level of the vapor-air interface and possibly cause the body of vapor to collapse. Accordingly, the 70° heat transfer liquid 14 from the filter 24 is directed into the preheater 28 where the liquid temperature is raised to approximately 400° F. prior to being fed back into the bottom of the facility 11 via output line 29.

Additionally, a conduit 36 carrying liquid 14, having relatively low amounts of flux contamination therein, communicates between the bottom of the facility 11 and the input of the pump 22 via valve 37. In operation, valve 37 is open while the valve 31 is closed (that is while the filter 21 is being pulsed filled during the 4 to 6 soldering cycles to a predetermined level) and the valve 37 is closed while the valve 31 is open. Accordingly, the heat transfer liquid 14 will continuously be flowing through the system purging the system lines and components of rosin flux which may have passed through the coarse filter 21.

Since relatively clean, hot heat transfer liquid can dissolve solid rosin flux adhering to cool surfaces, this arrangement results in substantially no blockage due to flux obstruction within the system. Also, when no visible rosin flux passes beyond the coarse filter 21, this arrangement results in a cleaner liquid because it passes twice through the mechanical filter cartridges resulting in a liquid that is substantially flux free.

COARSE FILTER

The coarse filter 21 may be one or more mechanical cartridge filters as hereinbefore described. However, in an exemplary embodiment a particular filter 21, described in detail in U.S. Pat. No. 4,378,296 titled "Flux Filter" by R. C. Carlson and E. J. March, filed in the U.S. Patent and Trademark Office on even date herewith, was used.

Figure 2:
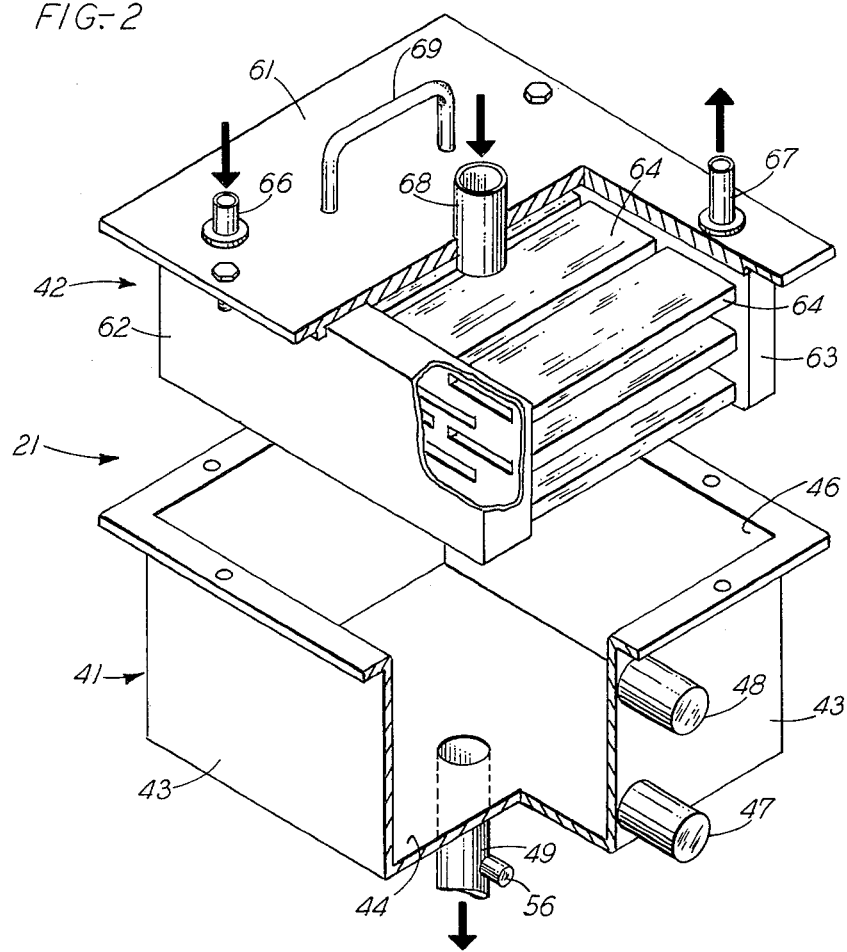
FIG. 2 is a partial cross-sectional isometric view of a coarse filter used in the instant system.

The exemplary coarse flux filter 21, shown in an exploded isometric view in FIG. 2, is comprised of a container 41 and a removable cooling chamber 42. The container 41 has a plurality of sidewalls 43—43 and a bottom 44 and has an opening 46 at the top. First and second liquid level sensors 47 and 48, respectively, are located in one of the sidewalls 43. An output conduit 49, having a temperature sensor 56 mounted therein, extends from the bottom 44 of the container 41.

Figure 3:
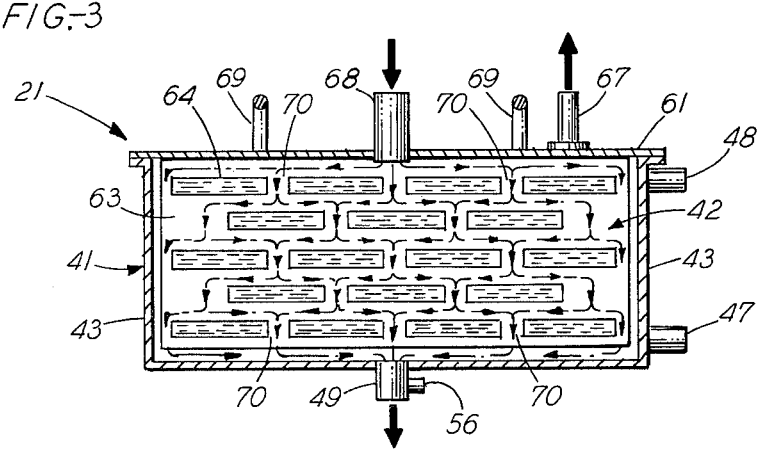
FIG. 3 is a cross-sectional view of the coarse filter depicting the flow of heat transfer therethrough.

The removable cooling chamber 42 is comprised of a top plate 61, first and second headers 62 and 63 fixedly mounted thereto. A plurality of spaced, hollow channel members 64—64 communicate between the first and second headers 62 and 63. The channel members 64—64 are mounted in a staggered fashion as can best be seen in the cross-sectional view of FIG. 3. A coolant input line 66 connects to the first header 62 while a coolant output line 67 connects to the second header 63. A liquid-flux input conduit 68 is centrally located in the top plate 61. A pair of handles 69—69 fixedly fastened on the top plate 61 are provided to facilitate removal and insertion of the cooling chamber 42 into the container 41 for replacement, repair or cleaning.

In operation, chilled water (e.g., 60° F.) continuously passes through coolant input line 66 into the first header 62, through the channel members 64—64, into the second header 63 and through the output line 67. The heat transfer liquid with the rosin flux therein passes through the input conduit 68 after each soldering cycle. The hot (e.g., 419° F.) liquid-flux mixture passes over the surfaces of the channel members 64—64 and through interstices 70—70. As the liquid-flux mixture cools rosin flux precipitates out and attaches to the cool surface of the members 64—64. At this time the output valve 31 is closed, the valve 37 open and the liquid-flux combination remains in the filter 21 until the level reaches the second level sensor 48 (approximately 4.5 minutes). This residence time within the coarse filter 21 is sufficient to ensure proper cooling of the liquid-flux mixture to effectively remove a substantial portion of the rosin flux therefrom and deposit it on the surfaces of the members 64—64. When the liquid-flux mixture reaches the second level sensor 48 it generates a signal over electrical leads (not shown) to open the valve 31 and close the valve 37 to release the coarsely filtered liquid through the output conduit 49. Once the level of the filtered liquid falls below the first level sensor 47 it generates a signal over electrical leads (not shown) to close valve 31 and open valve 37 to accumulate the liquid-flux mixture and repeat the foregoing filtering steps.

Additionally, as the rosin flux continues to deposit on the members 64—64, it acts as an insulator reducing the heat transfer effectiveness of the members. As a result the temperature of the heat transfer liquid exiting via the conduit 49 will increase over a period of time depending upon the product soldered and the amount of rosin flux used. The temperature sensor 56 in the conduit 49 continuously monitors the filtered material and when the temperature attains a predetermined value an indicator light (not shown) is illuminated under the control of the temperature sensor to direct an operator to remove and clean or replace the cooling chamber 42. This eliminates the need for a visual inspection of the members 64—64 by the operator which is time consuming and difficult due to the staggered arrangement of the members.

PREHEATER

The preheater 28 may also be one of various types of well known heating arrangements. However, in an exemplary embodiment the particular preheater 28 used is described in detail in U.S. Pat. No. 4,380,431 titled "A Technique for Elevating the Temperature of a Fluid" by R. C. Carlson and E. J. March, filed in the U.S. Patent and Trademark Office on even date herewith.

Figure 4:
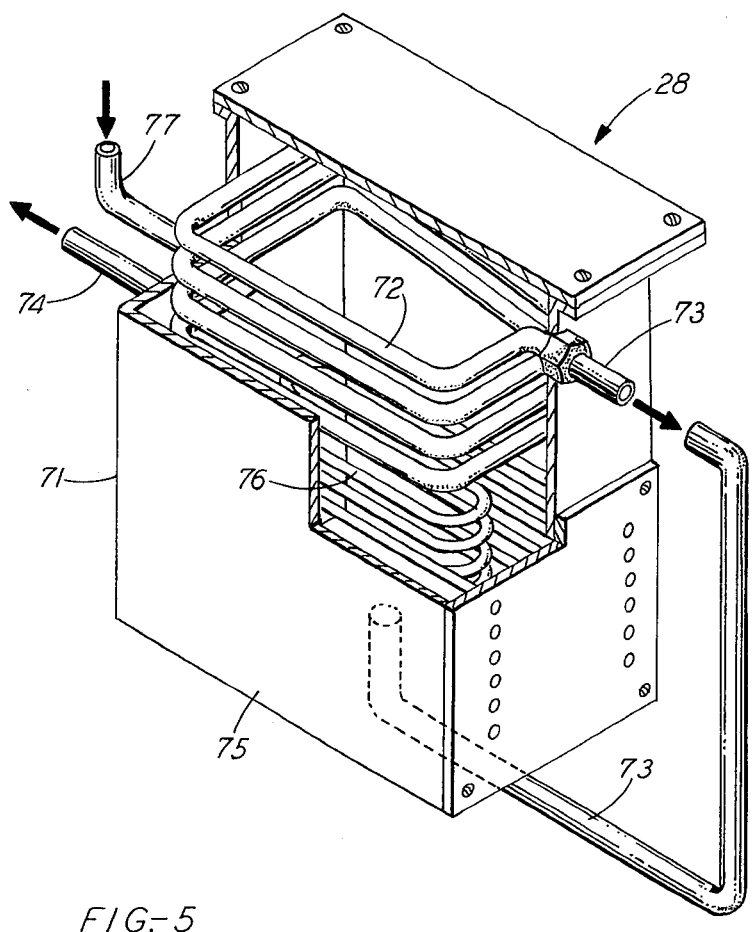
FIG. 4 is a partial cross-sectional isometric view of a preheater used in the instant system.
Figure 5:
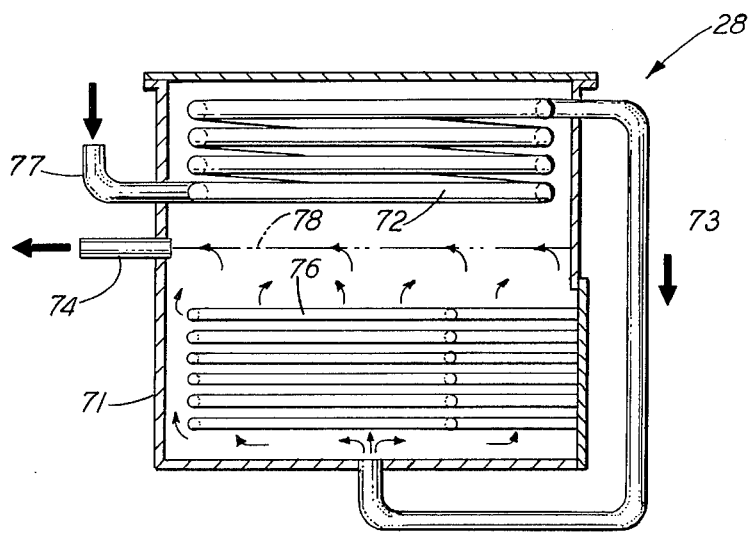
FIG. 5 is a cross-sectional view of the preheater used to implement the instant system.

The preheater 28, shown in an isometric view in FIG. 4 and a cross-sectional view in FIG. 5 is comprised of an enclosed chamber 71 having cooling coils 72 located in the upper portion thereof. The coils 72 communicate with the bottom of the chamber 71 via conduit 73 as can best be seen in the cross-sectional view of FIG. 5. An outlet pipe 74 is located in a sidewall 75 of the chamber 71 intermediate the coils 72 and a plurality of heating elements 76—76 located in the bottom portion of the chamber.

In operation, the filtered heat transfer liquid 14, at about 70° F., enters the cooling coils 72 from the input line 77, travels through the coils 72, conduit 73, and into the bottom of the chamber 71 reaching a nominal level 78. The heat transfer liquid 14 is then heated by elements 76—76 to 400° F. and leaves the chamber 71 through the outlet pipe 74.

As the liquid 14 is being heated, a portion thereof, unavoidably, will boil and vaporize, tending to raise the pressure within the enclosed chamber 71. In particular, pressure will build up when the liquid level is higher than the outlet pipe 74 due to a blockage or restricted flow therein. However, the pressure will be reduced due to condensation of the vapor on the coils 72 which are much cooler (e.g., 70° F.) than the vapor. Furthermore, such condensation of the hot vapor will cause the liquid 14 in the coils 72 to be preheated to a temperature of about 200° F. prior to flowing back into the bottom of the chamber 71. Such preheating lowers the amount of energy used by the heating elements 76—76 to raise the temperature of the liquid 14 to about 400° F.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of removing flux from a liquid-flux mixture draining from an article subjected to condensing, hot, saturated vapor of the liquid from a boiling reservoir of the liquid in a condensation heating facility, the method comprising the steps of:

diverting the draining mixture, from the boiling liquid reservoir, into a first flux filter;

accumulating the mixture in the first flux filter to remove a portion of the flux therefrom;

alternately discharging the filtered mixture from the first flux filter and the liquid from the reservoir to provide a continuous flow into a heat exchanger to lower the temperature thereof to precipitate out flux residue therein; and passing the liquid with the precipitate therein, through a second flux filter resulting in a substantially flux free heat transfer liquid.

2. The method as set forth in claim 1, comprising the additional steps of:

preheating the filtered liquid from the second filter to an elevated temperature; and discharging the preheated, filtered, liquid into the reservoir of the condensation heating facility.

3. The method as set forth in claim 1, wherein flux is filtered from the liquid-flux mixture in the first flux filter by:

directing the liquid-flux mixture into a container having a plurality of spaced hollow members therein; and passing a coolant through the hollow members to lower the temperature of the mixture to precipitate out flux therein, the flux depositing on the surface of the members.

4. The method as set forth in claim 3, characterized by:

accumulating the mixture in the chamber to a predetermined level.

5. Apparatus for removing flux from a liquid-flux mixture draining from an article subjected to condensing, hot, saturated vapor of the liquid from a boiling reservoir of the liquid in a condensation heating facility, the apparatus comprising:
first and second flux filters;
means for diverting the draining mixture, from the boiling liquid reservoir, into the first flux filter;
means for accumulating the mixture in the first flux filter to remove a portion of the flux therefrom;
means for alternately discharging the partially filtered mixture and the liquid from the reservoir to provide a continuous flow into a heat exchanger to lower the temperature thereof to precipitate out flux residue therein; and
means for passing the liquid, with the precipitate therein, through the second filter resulting in a substantially flux-free heat transfer liquid.

6. The apparatus as set forth in claim 5, comprising:
means for preheating the filtered liquid from the second filter to an elevated temperature; and
means for discharging the preheated, filtered, liquid into the reservoir of the condensation heating facility.

7. The apparatus as set forth in claim 5, wherein the first flux filter comprises:
a plurality of hollow members through which a cooling fluid can flow to cause flux to deposit thereon.

8. A method of removing flux from a liquid-flux mixture draining from an article subjected to condensing, hot, saturated vapor of the liquid from a boiling reservoir of the liquid in a condensation heating facility, the method comprising the steps of:
diverting the draining mixture, from the boiling liquid reservoir, into a first flux filter;
accumulating the mixture in the first flux filter to remove a portion of the flux therefrom;
alternately discharging the filtered mixture from the first flux filter and the liquid from the reservoir to provide a continuous flow into a heat exchanger to lower the temperature thereof to precipitate out flux residue therein;
passing the liquid with the precipitate therein, through a second flux filter resulting in a substantially flux free heat transfer liquid;
preheating the filtered liquid from the second filter to an elevated temperature by:
directing the liquid through coils mounted in the upper portion of an enclosed chamber;
passing the liquid from the coils to a reservoir in the lower part of the chamber;
heating the liquid, in the reservoir, to the elevated temperature, forming a vapor thereof in the upper portion of the chamber;
condensing the vapor on the coils to transfer the latent heat of vaporization to the coils to preheat the liquid while simultaneously lowering the pressure within the chamber; and
discharging the preheated, filtered, liquid into the reservoir of the condensation heating facility.

9. Apparatus for removing flux from a liquid-flux mixture draining from an article subjected to condensing, hot, saturated vapor of the liquid from a boiling reservoir of the liquid in a condensation heating facility, the apparatus comprising:
first and second flux filters;
means for diverting the draining mixture, from the boiling liquid reservoir, into the first flux filter;
means for accumulating the mixture in the first flux filter to remove a portion of the flux therefrom;
means for alternately discharging the partially filtered mixture and the liquid from the reservoir to provide a continuous flow into a heat exchanger to lower the temperature thereof to precipitate out flux residue therein;
means for passing the liquid, with the precipitate therein, through the second filter resulting in a substantially flux-free heat transfer liquid;
means for preheating the filtered liquid from the second filter to an elevated temperature comprising:
a plurality of coils mounted in the upper portion of an enclosed chamber to receive the liquid to be heated;
a conduit communicating between the output of the coils and a reservoir at the lower portion of the chamber;
at least one heating element in the reservoir to heat liquid directed therein to the elevated temperature; and
means for discharging the preheated, filtered, liquid into the reservoir of the condensation heating facility.

* * * * *